Dec. 25, 1973 R. J. SCHOERNER ET AL Re. 27,854
INSULATED TELEPHONE CABLE
Original Filed April 7, 1969
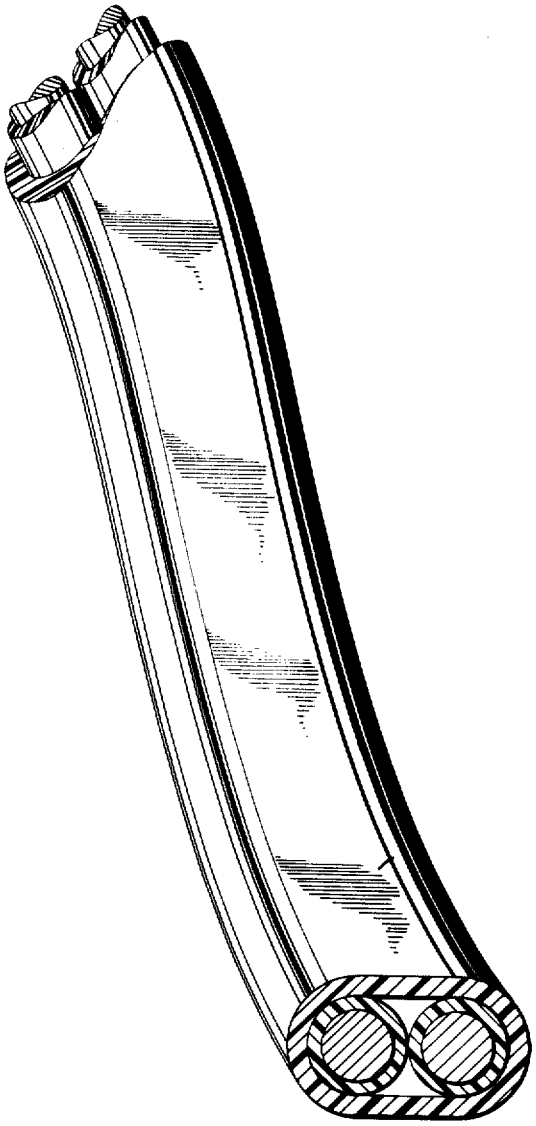

United States Patent Office

Re. 27,854
Patented Dec. 25, 1973

27,854
INSULATED TELEPHONE CABLE

Roger J. Schoerner, Carrollton, Ga., assignor to Southwire Company, Carrollton, Ga.

Original No. 3,515,796, dated June 2, 1970, Ser. No. 814,200, Apr. 7, 1969, which is a continuation-in-part of Ser. No. 779,376, Nov. 27, 1968, which in turn is a continuation-in-part of Ser. No. 730,933, May 21, 1968, both now abandoned. Application for reissue Oct. 12, 1972, Ser. No. 296,940
The portion of the term of the patent subsequent to May 19, 1987, has been disclaimed
Int. Cl. H01b *11/00*
U.S. Cl. 174—113 R 12 Claims

Matter enclosed in heavy brackets [ ] appears in the original patent but forms no part of this reissue specification; matter printed in italics indicates the additions made by reissue.

ABSTRACT OF THE DISCLOSURE

An insulated telephone cable is prepared from individually insulated conductors which are gathered together and insulated as a unit. The individually insulated conductors are prepared from aluminum alloy wires having an acceptable electrical conductivity of at least sixty-one percent based on the International Annealed Copper Standard and an increased tensile strength when compared to conventional aluminum alloy wire of the same percent ultimate elongation. In addition, the present wire has an increased percent ultimate elongation when compared to conventional wire of the same tensile strength. The aluminum alloy wires contain substantially evenly distributed iron aluminate inclusions in a concentration produced by the addition of more than about 0.30 weight percent iron and no more than 0.15 weight percent silicon to an alloy mass containing less than about 99.70 weight percent aluminum and trace quantities of conventional impurities normally found within a commercial aluminum alloy. The substantially evenly distributed iron aluminate inclusions are obtained by continuously casting an alloy consisting essentially of less than about 99.70 weight percent aluminum, more than 0.30 weight percent iron, no more than 0.15 weight percent silicon and trace quantities of typical impurities to form a continuous aluminum alloy bar, hot-working the bar substantially immediately after casting in substantially that condition in which the bar is cast to form continuous rod which is subsequently drawn into wire without intermediate anneals, annealed after the final draw and insulated. After annealing and insulating, the individual wires are brought together and insulated with an outer sheath. The telephone cable generally consists of two or more individually insulated wires brought together in a conventional stranding operation.

CROSS-REFERENCE TO RELATED APPLICATIONS

This application is a continuation-in-part of my copending application Ser. No. 779,376 filed Nov. 27, 1968, which is in turn a continuation-in-part of my copending application Ser. No. 730,933 filed May 21, 1968, both now abandoned.

DISCLOSURE

This invention relates to an insulated aluminum alloy telephone cable and more particularly concerns a telephone cable which is prepared from aluminum alloy wires having an acceptable electrical conductivity and improved elongation, bendability and tensile strength.

The figure is a view in section of the telephone cable made up of two insulated wires.

Within the telephone cable industry there exists a great need to develop a usable substitute for copper in the manufacture of most forms of telephone cable. Efforts in the past have been directed toward alloys of aluminum such as EC, 6201, and 5005 grades. Each of these alloys, however, possessed some physical characteristic which proved unsuitable. While EC had an acceptable conductivity, its tensile strength was not high enough at a usable percent ultimate elongation, and at a usable tensile strength, its percent ultimate elongation was not high enough. With respect to 6201 and 5005, physical properties were improved but electrical conductivity was too low.

A need, therefore, has arisen within the industry for an aluminum alloy wire for use in manufacturing telephone cable, such a wire to have physical properties of 13,000 to 22,000 p.s.i. tensile strength, 40% to 5% ultimate elongation, and acceptable conductivity. Preferably, the wire should have a tensile strength of 16,000 to 18,000 p.s.i. and percent ultimate elongation of 20% to 10%.

It is, therefore, an object of the present invention to provide a telephone cable manufactured from individual wires which have a tensile strength of 13,000 p.s.i. to 22,000 p.s.i., percent ultimate elongation of 40% to 5%, and an acceptable conductivity of at least 61% of the International Annealed Copper Standard (hereinafter-sometimes referred to as IACS). Other objects, features and advantages of the present invention will become apparent from a review of the following detailed description.

In accordance with this invention, the present insulated telephone cable is manufactured from individual wires which are prepared from an aluminum alloy comprising less than about 99.70 weight percent aluminum, more than about 0.30 weight percent iron, and no more than 0.15 weight percent silicon. Preferably, the aluminum content of the present alloy comprises from about 98.95 to less than about 99.45 weight percent with particularly superior results being achieved when from about 99.15 to about 99.40 weight percent aluminum is employed. Preferably, the iron content of the present alloy comprises 0.45 to about 0.95 weight percent with particularly superior results being achieved when from about 0.50 weight percent to about 0.80 weight percent iron is employed. Preferably, no more than 0.07 weight percent silicon is employed in the alloy of the present conductor. The ratio between the percentage iron and percentage silicon must be 1.99:1 or greater. Preferably, the ratio between percentage iron and percentage silicon is 8:1 or greater. Thus, if the present aluminum alloy conductor contains an amount of iron within the low area of the present range for iron content, the percentage of aluminum must be increased rather than increasing the percentage of silicon outside the ratio limitation previously specified. It has been found that a properly processed individual wire having aluminum alloy constituents which fall within the above-specified ranges possesses acceptable conductivity and a tensile strength of about 13,000 p.s.i. to about 22,000 p.s.i. and a percent ultimate elongation of about 40% to about 5%.

The present individual aluminum alloy wires are prepared by initially melting and alloying aluminum with the necessary amounts of iron or other constituents to provide the requisite alloy for processing. Normally the content of silicon is maintained as low as possible without adding additional amounts to the melt. Typical impurities or trace elements are also present within the melt but only in trace quantities such as less than 0.05 weight percent each with a total content of trace impurities generally not exceeding 0.15 weight percent. Of course, when adjusting the amounts of trace elements due consideration must be given to the conductivity of the final alloy since some trace elements effect conductivity more severely than others. The typical trace elements include vanadium, copper, manganese, magnesium, zinc, boron and titanium. If the content of titanium is relatively high (but still quite low compared to the aluminum, iron and silicon content), small amounts of boron may be added to tie-up the excess titanium and keep it from reducing the conductivity of the wire. Iron is the major constituent added to the melt to produce the alloy of the present invention. Normally about 0.50 weight percent iron is added to the typical aluminum component used to prepare the present alloy. Of course, the scope of the present invention includes the addition of more or less iron together with the adjustment of the content of all alloying constituents.

After alloying, the melted aluminum composition is continuously cast into a continuous bar. The bar is then hot-worked in substantially that condition in which it is received from the casting machine. A typical hot-working operation comprises rolling the bar in a rolling mill substantially immediately after being cast into a bar.

One example of a continuous casting and rolling operation capable of producing continuous rod as specified in this application is as follows:

A continuous casting machine serves as a means for solidifying the molten aluminum alloy metal to provide a cast bar that is conveyed in substantially the condition in which it solidified from the continuous casting machine to the rolling mill which serves as a means for hot-forming the cast bar into rod or another hot-formed product in a manner which imparts substantial movement to the cast bar along a plurality of angularly disposed axes.

The continuous casting machine is of conventional casting wheel type having a casting wheel with a casting groove partially closed by an endless belt supported by the casting wheel and an idler pulley. The casting wheel and the endless belt cooperate to provide a mold into one end of which molten metal is poured to solidify and from the other end of which the cast bar is emitted in substantially that condition in which it solidified.

The rolling mill is of conventional type having a plurality of roll stands arranged to hot-form the cast bar by a series of deformations. The continuous casting machine and the rolling mill are positioned relative to each other so that the cast bar enters the rolling mill substantially immediately after solidification and in substantially that condition in which it solidified. In this condition, the cast bar is at a hot-forming temperature within the range of temperatures for hot-forming the cast bar at the initiation of hot-forming without heating between the casting machine and the rolling mill. In the event that it is desired to closely control the hot-forming temperature of the cast bar within the conventional range of hot-forming temperatures, means for adjusting the temperature of the cast bar may be placed between the continuous casting machine and the rolling mill without departing from the inventive concept disclosed herein.

The roll stands each include a plurality of rolls which engage the cast bar. The rolls of each roll stand may be two or more in number and arranged diametrically opposite from one another or arranged at equally spaced positions about the axis of movement of the cast bar through the rolling mill. The rolls of each roll stand of the rolling mill are rotated at a predetermined speed by a power means such as one or more electric motors and the casting wheel is rotated at a speed generally determined by its operating characteristics. The rolling mill serves to hot-form the cast bar into a rod of a cross-sectional area substantially less than that of the cast bar as it enters the rolling mill.

The peripheral surfaces of the rolls of adjacent roll stands in the rolling mill change in configuration; that is, the cast bar is engaged by the rolls of successive roll stands with surfaces of varying configuration, and from different directions. This varying surface engagement of the cast bar in the roll stands functions to knead or shape the metal in the cast bar in such a manner that it is worked at each roll stand and also to simultaneously reduce and change the cross-sectional area of the cast bar into that of the rod.

As each roll stand engages the cast bar, it is desirable that the cast bar be received with sufficient volume per unit of time at the roll stand for the cast bar to generally fill the space defined by the rolls of the roll stand so that the rolls will be effective to work the metal in the cast bar. However, it is also desirable that the space defined by the rolls of each roll stand not be over-filled so that the cast bar will not be forced into the gaps between the rolls. Thus, it is desirable that the rod be fed toward each roll stand at a volume per unit of time which is sufficient to fill, but not overfill, the space defined by the rolls of the roll stand.

As the cast bar is received from the continuous casting machine, it usually has one large flat surface corresponding to the surface of the endless band and inwardly tapered side surfaces corresponding to the shape of the groove in the casting wheel. As the cast bar is compressed by the rolls of the roll stands, the cast bar is deformed so that it generally takes the cross-sectional shape defined by the adjacent peripheries of the rolls of each roll stand.

Thus, it will be understood that with this apparatus, cast aluminum alloy rod of an infinite number of different lengths is prepared by simultaneous casting of the molten aluminum alloy and hot-forming or rolling the cast aluminum bar.

The continuous rod produced by the casting and rolling operation is then processed in a reduction operation designed to produce continuous wire of various gauges between No. 12 AWG (cross-sectional diameter or greatest perpendicular distance between parallel faces of 0.081 inch) and No. 30 AWG (cross-sectional diameter or greatest perpendicular distance between parallel faces of 0.0100 inch). The reduction operation consists of a process whereby unannealed rod (i.e., as rolled to *f* temper) is cold-drawn through a series of progressively constricted dies, without intermediate anneals, to form a continuous wire of desired diameter. At the conclusion of this drawing operation, the alloy wire will have an excessively high tensile strength and an unacceptably low ultimate elongation, plus a conductivity below that which is industry accepted as the minimum for use in a telephone cable, i.e., sixty-one percent of IACS. The wire is then annealed for partially annealed to obtain a desired tensile strength and cooled. At the conclusion of the annealing operation, it is found that the annealed alloy wire has the properties of acceptable conductivity and improved tensile strength and percent ultimate elongation. The annealing operation may be continuous as in resistance annealing, induction annealing, convection annealing by continuous furnaces, or radiation annealing by continuous furnaces; or, preferably, may be batch annealed in a batch furnace. In addition, the present aluminum alloy wire may be partially annealed by resistance or induction annealing and then additionally annealed by batch annealing. When continuously annealing, temperatures of 450° F. to about 1200° F. may be employed with annealing times of about five minutes to about $1/10{,}000$ of a minute. Generally, however, continuous annealing temperatures and times may be adjusted to meet the requirements of the particular overall processing operation so long as the desired tensile strength is achieved. In a batch annealing operation, a temperature of approximately 400° F. to about 750° F. is employed with residence times of about twenty-four (24) hours to about thirty (30) minutes. As mentioned with respect to continuous annealing, in batch annealing the times and temperatures may be varied to suit the overall process so long as the desired tensile strength is obtained. Simply by way of example, it has been found that the following tensile strengths in the aluminum alloy wires of the present conductor are achieved with the listed batch annealing temperatures and times.

TABLE I

| Tensile strength | Temperature (° F.) | Time (hours) |
|---|---|---|
| 13,000 to 15,000 | 550 | 3 |
| 15,000 to 17,000 | 520 | 3 |
| 17,000 to 22,000 | 480 | 3 |

During the continuous casting of this alloy, a substantial portion of the iron present in the alloy precipitates out of solution as iron aluminate intermetallic compound ($FeAl_3$). Thus, after casting, the bar contains a dispersion of $FeAl_3$ in a supersaturated solid solution matrix. The supersaturated matrix may contain as much as 0.17 weight percent iron. As the bar is rolled in a hot-working operation immediately after casting, the $FeAl_3$ particles are broken up and dispersed throughout the matrix inhibiting large cell formation. When the rod is then drawn to its final gauge size without intermediate anneals and then aged in a final annealing operation, the tensile strength, elongation and bendability are increased due to the small cell size and the additional pinning of dislocations by preferential precipitation of $FeAl_3$ on the dislocation sites. Therefore, new dislocation sources must be activated under the applied stress of the drawing operation and this causes both the strength and the elongation to be further improved.

The properties of the present aluminum alloy wire are significantly affected by the size of the $FeAl_3$ particles in the matrix. Coarse precipitates reduce the percent elongation and bendability of the wire by enhancing nucleation and, thus, formation of large cells which, in turn, lowers the recrystallization temperature of the wire. Fine precipitates improve the percent elongation and bendability by reducing nucleation and increasing the recrystallization temperature. Grossly coarse precipitates of $FeAl_3$ cause the wire to become brittle and generally unusable. Coarse precipitates have a particle size of above 2,000 angstrom units and fine precipitates have a particle size of below 2,000 angstrom units.

Following the annealing operation the aluminum alloy wire is continuously insulated in a standard continuous insulating operation. A typical insulating operation comprises passing the wire through an extrusion head. As the conductor passes through the head, a continuous thermoplastic coat of insulation is generated around the conductor. The coated conductor is then cooled in the air or by contact with a cooling bath. The insulating material should be one which is capable of insulating the wire and the material should be of a thickness sufficient to insulate the wire and withstand the physical hazards associated with the processing of the wire into a telephone cable. Typical thicknesses of insulation are between about 0.001 inch and 0.20 inch. A preferred insulating material is polyethylene, but other coatings such as neoprene, polypropylene and polyvinyl chloride may also be employel.

After insulation is applied to the individual wires, two or more of the insulated wires are brought together and twisted as a pair. These pairs may then be cabled into groups and these groups may be subsequently cabled into larger groups or cables. These groups or cables are then fed through a second extrusion head where an outer sheath of insulation is applied around the individually insulated wires. Alternatively, the groups or cables may be wrapped with a thin sheet or tape of plastic material prior to application of the outer sheath of insulation. As the insulated telephone cable emerges from the second extrusion head, it is cooled in the air or by contact with a cooling bath. The exterior insulation material is, preferably, polyethylene with other thermoplastic materials such as polypropylene, polyvinyl chloride and neoprene being suitable. The finished telephone cable may be additionally sheathed or armored in conventional fashion, if such is desired. A typical #18 AWG aluminum alloy wire suitable for use in the telephone cable of the present invention has physical properties of 17,000 p.s.i. tensile strength, ultimate elongation of 14%, and conductivity of 61% IACS. Ranges of physical properties generally provided by a suitable #18 AWG wire prepared from the present alloy include tensile strengths of about 13,000 to about 22,000 p.s.i., ultimate elongations of about 40% to about 5% and conductivities of about 61% to about 63%. Preferred wires have a tensile strength of between 16,000 and 18,000 p.s.i., an ultimate elongation of between 20% and 10%, and a conductivity of between 61% and 63%.

A comparison between prior insulated individual alumi- be obtained from the following examples.

EXAMPLE NO 1

A comparison between prior insulated individual aluminum alloy wire and the present insulated individual aluminum alloy wire is provided by preparing a prior alloy with aluminum content of 99.73 weight percent, iron content of 0.18 weight percent, silicon content of 0.059 weight percent, and trace amounts of typical impurities. The present alloy is prepared with aluminum content of 99.45 weight percent, iron content of 0.34 weight percent, silicon content of 0.056 weight percent, and trace amounts of typical impurities. Both alloys are continuously cast into continuous bars and hot-rolled into continuous rod in similar fashion. The alloys are then cold-drawn through successively constricted dies without intermediate anneals to yield #18 AWG continuous wire. Sections of the wire are collected on separate bobbins and batch furnace annealed at various temperatures and for various lengths of time to yield sections of the prior alloy wire and the present alloy wire of varying tensile strength.

Several samples of the present alloy #18 AWG wire and the prior alloy #18 AWG wire are tested for tensile strength and percent ultimate elongation by standard testing procedures. At the instant of breakage, the increase in length of the wire is measured. The percent ultimate elongation is then figured by dividing the initial length of the wire sample into the increase in length of the wire sample. The tensile strength of the wire sample is recorded as the pounds per square inch of cross-sectional diameter required to break the wire during the test. The results are as follows:

TABLE II

| Prior alloy wire | | Present alloy wire | |
|---|---|---|---|
| Tensile strength | Percent ultimate elongation | Tensile strength | Percent ultimate elongation |
| 10,000 | 30.5 | 13,700 | 30.5 |
| 12,500 | 20 | 14,200 | 29.4 |
| 13,500 | 14 | 15,000 | 25 |
| 14,000 | 12 | 16,000 | 19.5 |
| 15,000 | 8 | 17,000 | 14 |
| 16,200 | 4 | 17,200 | 13.2 |
| 18,000 | 2.5 | 18,200 | 8.8 |
| | | 19,575 | 6.2 |

EXAMPLES 2 THROUGH 7

Six aluminum alloys are prepared with varying amounts of major constituents. The alloys are reported in the following table:

TABLE III

| Example No. | Percent Al | Percent Fe | Percent Si |
|---|---|---|---|
| 2 | 99.73 | 0.180 | 0.059 |
| 3 | 99.52 | 0.385 | 0.063 |
| 4 | 99.46 | 0.450 | 0.056 |
| 5 | 99.36 | 0.540 | 0.064 |
| 6 | 99.275 | 0.680 | 0.015 |
| 7 | 99.20 | 0.750 | 0.030 |

The six alloys are then cast into six continuous bars and hot-rolled into six continuous rods. The rolls are cold-drawn through successively constricted dies to yield #12 gauge wire. The wire produced from the alloys of Examples No. 2 and 4 are resistance annealed and the remainder of the examples are batch furnace annealed to yield the tensile strengths reported in Table IV. Each of the wires is tested for percent conductivity, tensile strength and percent ultimate elongation. The results are reported in the following table:

TABLE IV

| Example No. | Conductivity in percent IACS | Tensile strength | Percent ultimate elongation |
|---|---|---|---|
| 2 | 62.8 | 15,200 | 8.3 |
| 3 | 61.3 | 15,175 | 28.4 |
| 4 | 61.5 | 15,175 | 37.8 |
| 5 | 61.5 | 15,175 | 35.6 |
| 6 | 61.25 | 14,400 | 28.9 |
| 7 | 61.2 | 15,875 | 26 |

From a review of these results it may be seen that Example No. 2 falls outside the scope of the present invention in percentage of components. In addition, it will be noted for Example No. 2 that the percentage ultimate elongation is somewhat lower than desirable.

EXAMPLE NO. 8

An aluminum alloy is prepared with an aluminum content of 99.42 weight percent, iron content of 0.50 weight percent, silicon content of 0.055 weight percent and trace amounts of typical impurities. The alloy is cast into a continuous bar which is hot-rolled to yield a continuous rod. The rod is then cold-drawn through successively constricted dies to yield #12 AWG wire. The wire is collected on a 30 inch bobbin until the collected wire weighs approximately 250 pounds. The bobbin is then placed in a cold General Electric Bell Furnace and the temperature therein is raised to 480° F. The temperature of the furnace is held at 480° F. for three hours after which the heat is terminated and the furnace cools to 400° F. The furnace is then quick cooled and the bobbin is removed. The anealed wire is then passed through an extrusion head and insulated with polyethylene. Two of the individually insulated wires are then brought together with no twist and fed into a second extrusion head where the two insulated wires are coated with an exterior sheath of polyethylene insulation.

EXAMPLE NO. 9

The alloy of Example No. 8 is cast into a continuous bar which is hot-rolled to yield a continuous *f* temper rod of ⅜ inch diameter. The rod is then cold-drawn through successively constricted dies to yield #14 AWG wire. The wire is then redrawn on a Synchro Model BG-16 wire drawing machine which includes a Synchro Resistoneal continuous in line annealer. The wire is drawn to #28 AWG at a finishing speed of 3,300 feet per minute and the in line annealer is operated at 52 volts with a transformer tap setting at No. 8. The annealed wire is then insulated by extruding polyethylene around the wire. Two of the individually insulated wires are then brought together with no twist and fed into a second extrusion head where they are coated with an exterior sheath of polyethylene.

EXAMPLE NO. 10

The alloy of Example No. 8 is cast into a continuous bar which is hot-rolled to yield a continuous *f* temper rod of ⅜ inch diameter. The rod is then cold-drawn on a Synchro Style No. FX13 wire drawing machine which includes a continuous in line annealer. The rod is drawn to #12 AWG wire at a finishing speed of 2,000 feet per minute and the in line annealer voltage at preheater #1 in 35 volts, at preheater #2 is 35 volts, and at the annealer is 22 volts. The three transformer taps are set at #5. The annealed wire is continuously insulated by passing through an extrusion head where polypropylene is applied. Eight of the individually insulated wires are stranded together in conventional fashion and fed into a second extrusion head where the stranded unit is coated with an exterior sheath of polypropylene.

In review, it should now be apparent that the individual wires of the present invention may be processed so that they have a tensile strength high enough to withstand the rigors of an insulating operation when using polyethylene as the insulating material. Since polyethylene is the standard insulation material, it is necessary that the individual wires be capable of withstanding insulation with that material. If, however, polypropylene is used as the insulating material, the tensile strength may be reduced, thus increasing percent ultimate elongation and yielding a cable with high flexibility. The tensile strength may be lowered in this particular embodiment because the wire does not have to be pulled through the extrusion head with as great a force when applying polypropylene as the insulating material.

In addition, it should be understood that when more than two individually insulated wires are employed in the telephone cable of the present invention, the wires may be stranded together in several formations such as are produced by concentric stranding, bunch stranding, alternate twist stranding, parallel stranding and rope lay stranding or by forming pairs and then cabling. After stranding or cabling, the unit of wires is then insulated as mentioned previously. It should also be understood that the number of wires grouped together in the cable is practically limitless and the present cable includes that number of wires which have previously been employed in telephone cables and also the addition of any taping or sheathing prior to or subsequent to an extrusion or tubing operation.

While this invention has been described in detail with particular reference to preferred embodiments thereof, it will be understood that variations and modifications can be effected within the spirit and scope of the invention as described hereinbefore and as defined in the appended claims.

I claim:

1. *Wrought* aluminum alloy telephone cable including at least two individually insulated aluminum alloy wires of a gauge between #12 AWG and #30 AWG and an outer coating of insulating material surrounding the insulated alloy wires, each wire having a minimum conductivity of sixty-one percent IACS and consisting essentially of from about 0.55 to about 0.95 weight percent iron; *about 0.015 to* [no more than] about 0.15 weight percent silicon; *from 0.0001* to less than 0.05 weight percent each of trace elements selected from the group consisting of vanadium, copper, manganese, magnesium, zinc, boron, and titanium; and from about 98.95 to less than 99.45 weight percent aluminum, said alloy containing *from 0.004 to* [no more than] 0.15 total weight percent trace elements and having an iron to silicon ratio of 8:1 or greater.

2. Aluminum alloy telephone cable of claim 1 consisting essentially of from about 0.80 to about 0.95 weight percent iron; and from about 0.07 to about 0.15 weight percent silicon; and from about 98.95 to about 99.13 weight percent aluminum.

3. Aluminum alloy telephone cable of claim 1 consisting essentially of from about 0.55 to about 0.80 weight percent iron; from about *0.015* [0.01] to about 0.07 weight percent silicon; and from about 99.15 to about 99.40 weight percent aluminum.

4. Aluminum alloy telephone cable of claim 1 consisting essentially of from about 0.55 to less than 0.60 weight percent iron; from about *0.015* [0.01] to about 0.15 weight percent silicon; and from about 99.10 to about 99.44 percent aluminum.

5. Aluminum alloy telephone cable of claim 1 wherein the insulating material is selected from the group consisting of polyethylene, neoprene, polypropylene, and poly(vinyl chloride).

6. Aluminum alloy telephone cable including at least two individually insulated aluminum alloy wires of a gauge between #12 AWG and #30 AWG and an outer coating of insulating material surrounding the insulated alloy wires, each wire having a minimum conductivity of sixty-one percent IACS and containing substantially evenly distributed iron aluminate inclusions in a concentration produced by the presence of about 0.45 to about 0.95 weight percent iron in an alloy mass consisting essentially of about 98.95 to less than 99.45 weight percent aluminum; *0.015 to* [no more than about] 0.15 weight percent silicon and *0.0001 to* [less than] 0.05 weight percent each of trace elements selected from the group consisting of vanadium, copper, manganese, magnesium, zinc, boron, and titanium *the total trace element content being from 0.004 to 0.15,* said iron aluminate inclusions having a particle size of less than 2,000 angstrom units.

7. Aluminum alloy telephone cable of claim 6 wherein iron is present in a concentration of about 0.50 to about 0.95 weight percent; silicon is present in a concentration of about *0.015* [0.01] to about 0.15 weight percent; and aluminum is present in aconcentration of about 98.95 to about 99.44 weight percent.

8. Aluminum alloy telephone cable of claim 6 wherein iron is present in a concentration of about 0.80 to about 0.95 weight percent; silicon is present in a concentration of about 0.07 to about 0.15 weight percent; and aluminum is present in a concentration of about 98.95 to about 99.13 weight percent.

9. Aluminum alloy telephone cable of claim 6 wherein iron is present in a concentration of about 0.50 to about 0.80 weight percent; silicon is present in a concentration of about *0.015* [0.01] to about 0.07 weight percent; aluminum is present in a concentration of about 99.15 to about 99.40 weight percent.

10. Aluminum alloy telephone cable of claim 6 wherein iron is present in a concentration of about 0.45 to less than 0.60 weight percent; silicon is present in a concentration of about *0.015* [0.01] to about 0.15 weight percent; and aluminum is present in a concentration of about 99.10 to about 99.54 weight percent.

11. Aluminum alloy telephone cable of claim 6 wherein iron is present in a concentration of about 0.55 to less than 0.60 weight percent; silicon is present in a concentration of about *0.015* [0.01] to about 0.15 weight percent; and aluminum is present in a concentration of about 99.10 to about 99.44 weight percent.

12. Aluminum alloy telephone cable of claim 6 wherein the insulating material is selected from the group consisting of polyethylene, neoprene, polypropylene, and poly(vinyl chloride).

[13. Aluminum alloy telephone cable of claim 1 wherein the silicon content is from 0.01 to 0.15 weight percent, the individual trace element content is from 0.001 to 0.05 weight percent, and the total trace element content is from 0.005 to 0.15 weight percent.]

[14. Aluminum alloy telephone cable of claim 6 wherethe silicon content is from 0.01 to 0.15 weight percent, the individual trace element content is from 0.0001 to 0.05, and the total trace element content is from 0.004 to 0.15 weight percent.]

References Cited

The following references, cited by the Examiner, are of record in the patented file of this patent or the original patent.

UNITED STATES PATENTS

| | | | |
|---|---|---|---|
| 3,063,832 | 11/1962 | Snyder. | |
| 3,397,044 | 8/1968 | Bylund. | |
| 2,252,421 | 8/1941 | Stroup | 75—138 |
| 2,545,866 | 3/1951 | Whitzel, et al. | 29—193 |
| 3,241,953 | 3/1966 | Pryor, et al. | 75—138 |
| 3,278,300 | 10/1966 | Kioke | 75—138 |
| 3,571,910 | 3/1971 | Byland. | |

OTHER REFERENCES

Transactions of the American Society for Metals, "The Effect of Single Addition Metals on the Recrystallization, Electrical Conductivity and Rupture Strength of Pure Aluminum," 1949, vol. 41, pp. 443 to 459.

Alloy Digest, "Aluminum EC," published by Engineering Alloys Digest, Inc.

Bell Laboratories Record, "Aluminum - Conductor Cable in Alternative to Copper," November 1967.

A. J. Field et al., The Electrical Conductivity or Aluminum Wire Journal of the Institute of Metals, 1933, 51, 183, 198.

H. J. Miller, Heat Treatment Finishing Operations in the Production of Copper and Aluminum Rod and Wire, Journal of the Institute of Metals, 1954–55, 83221–232.

Gaston G. Gauthier, The Conductivity of Super-Purity Aluminum; The Influence of Small Additions, Journal of the Institute of Metals, 1936, 59, 129–150.

Krupotkin, Y. A., et al., Effect of Small Impurities of Iron, Nickel and Cobalt on the Mechanical Properties and Electrical Conductivity of Aluminum, I, Z. V. Vysshikh Uchebn, Zaveden II, Energ. 8, No. 10, 112–116, 1965.

ELLIOT GOLDBERG, Primary Examiner

U.S. Cl. X.R.

29—193